March 4, 1969  C. F. BENSON  3,431,037
RETAINER LUG CONSTRUCTION
Filed July 3, 1967  Sheet 1 of 2

INVENTOR
CARL F. BENSON

BY Mason, Porter, Diller & Brown
ATTORNEYS

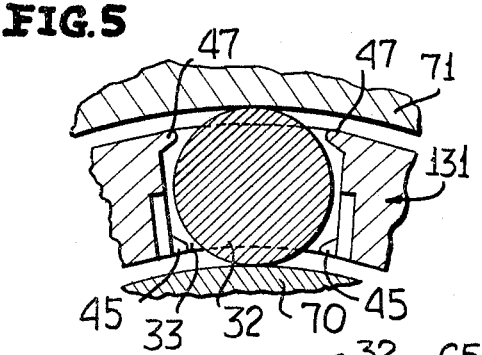
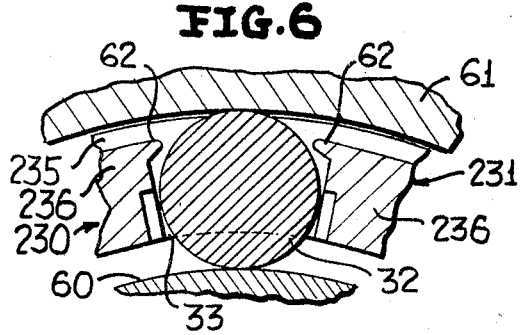
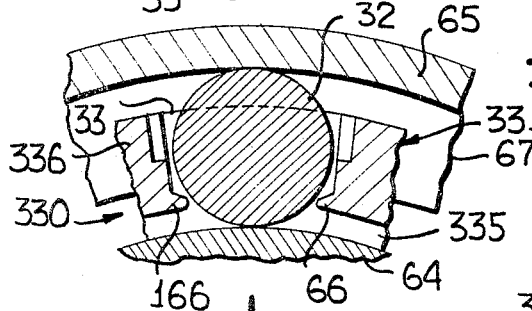
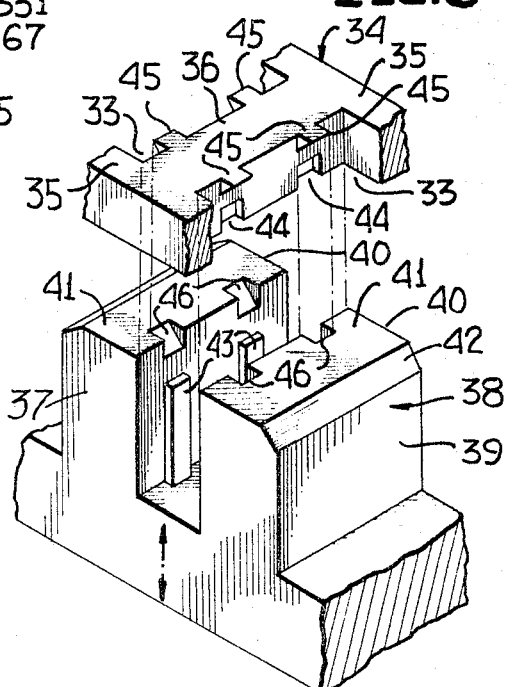
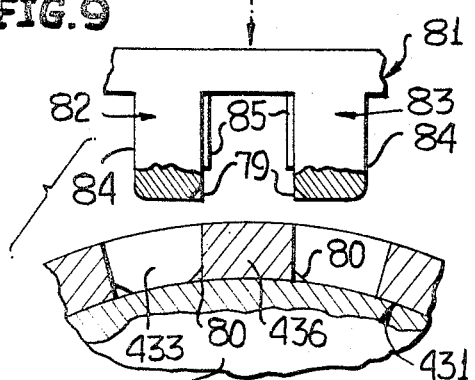
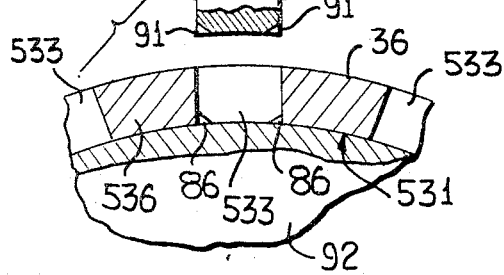
INVENTOR
CARL F. BENSON

United States Patent Office 3,431,037
Patented Mar. 4, 1969

3,431,037
RETAINER LUG CONSTRUCTION
Carl F. Benson, Torrington, Conn., assignor to The Torrington Company, Torrington, Conn., a corporation of Maine
Filed July 3, 1967, Ser. No. 650,690
U.S. Cl. 308—217                    4 Claims
Int. Cl. F16c 33/46

ABSTRACT OF THE DISCLOSURE

This subject has to do with a retainer for rolling bearing elements wherein the retainer is of the type which includes a pair of side rims and bars extending at spaced intervals between the side rims and combining therewith to define pockets. This disclosure particularly has to do with the formation of retaining lugs on the bars with the lugs projecting into the pockets. The lugs are formed by means of punches which form grooves in the faces of the lug defining walls of the pockets with the resultant material being extruded under controlled conditions remote from the grooves generally normal to the face of the bar to define lugs.

---

This invention relates in general to new and useful improvements in retainers for rolling elements in antifriction bearings, and more particularly to the formation of retaining lugs on bars of a retainer for retaining rolling elements within pockets of the retainer.

In accordance with this invention, a simple stamped strip of sheet metal is prepared with the desired form of roll retainment before rolling the part into circular form. Thus, from a single stamped strip retainers can be made with inner or outer roll retainment, or both, the retainer may be roll riding or outer or inner race riding or any desirable combination thereof. After rolling to circular form, the ends may be welded together or may be left unwelded if requirements do not demand welding.

While others have formed retainer bars to guide and retain the rollers, I have merely reshaped the edges of the retainer slot without removing material and obtained sufficient projection to hold the rollers securely. This is accomplished by extruding metal from adjacent one boundary of a pocket towards the other boundary of the pocket and into the pocket under controlled conditions to provide lugs.

The formation of the lugs may be obtained by way of a simple punching operation wherein a punch is brought into supporting contacting engagement with a face of a bar which defines a wall of a pocket, and thereafter a tool element projecting from the punch engages the bar at one edge of the face and extrudes metal towards the other edge of the same bar face with the result that metal adjacent the other edge of the bar face is extruded generally normal to the bar face in accordance with the contours of a lug shaping surface on the punch.

Another object of this invention is to provide a simple method of forming lugs on bars of retainers wherein the lugs are strong and wherein the lugs may be formed in a simple punching operation with metal being displaced from an area of the bar where it may be readily spared and extruded from the face of the bar under controlled shaping conditions in position for retainment of a roller.

A still further object of this invention is to provide a novel tool for effecting a punching operation on a retainer bar and extruding metal therefrom to define roller retaining lugs, as set forth above.

With the above and other objects in view that will hereinafter appear, the nature of the invention will be more clearly understood by reference to the following detailed description, the appended claims and the several views illustrated in the accompanying drawings:

In the drawings:

FIGURE 5 is a fragmentary transverse sectional view taken through a bearing assembly where the retainer is of the roll riding type.

FIGURE 6 is a sectional view similar to FIGURE 5 of a bearing assembly wherein the retainer is of the outer race riding type.

FIGURE 7 is a sectional view similar to FIGURE 5 of the bearing assembly wherein the retainer is of the inner race riding type.

FIGURE 8 is a perspective view of a punch and strip assembly and shows the manner in which the retaining lugs are formed on a bar of the strip.

FIGURE 9 is a schematic elevational view of a punch for forming retaining lugs on a cylindrical retainer having rectangular cross sectional bars.

FIGURE 10 is an elevational view similar to FIGURE 9 of a punch and retainer assembly wherein the retainer has rectangular cross sectional pockets.

Figure 1:
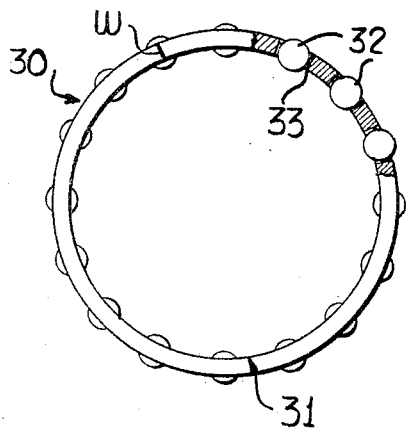
FIGURE 1 is a side elevational view of a retainer and the roller assembly formed in accordance with this invention, a portion of the retainer being broken away and shown in section to clearly illustrate the position of the rollers within the retainer.

Referring now to the drawings in detail, it will be seen that there is illustrated in FIGURE 1 a roller and retainer assembly, which is generally referred to by the numeral 30. The assembly 30 is formed of a retainer 31, which is formed in accordance with this invention, and has a plurality of conventional rolling elements or rollers 32 retained therein in assembled relation. The retainer 31 has a plurality of pockets 33, there being one pocket 33 for each of the rollers 32 and each roller 32 is retained within its respective pocket 33 for restraint against movement in at least one radial direction.

Figure 2:
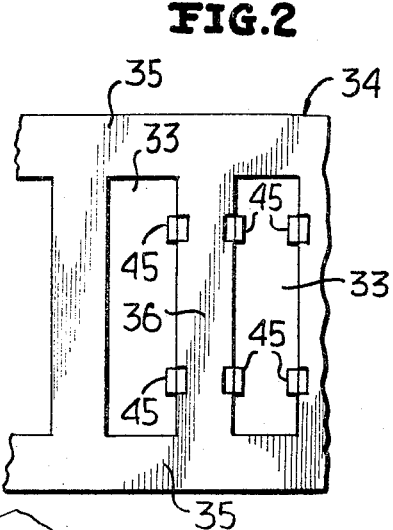
FIGURE 2 is a fragmentary plan view of a flat strip from which the retainer of FIGURE 1 is formed.

It is preferred, but not necessarily required, that the retainer 31 be formed from a flat strip, such as the strip 34 illustrated in FIGURE 2. The strip 34 is automatically fed into a conventional punch press type machine wherein the pockets 33 are formed by punching out the material of the strip 34. As a result, the strip 34 may be defined as being formed of a pair of rims 35 which are interconnected at spaced intervals by means of bars 36 and wherein the rims 35 and the bars 36 cooperate to define the pockets 33. It is to be understood that the strip 34 of FIGURE 2 is formed by a progressive punching operation, although all of the pockets of a predetermined length of strip may be simultaneously formed, and thereafter the necessary retaining lug forming operation may be performed on that strip.

In accordance with this invention, a further operation is performed on the strip 34 before it is shaped to form the retainer 31. As is best shown in FIGURE 8, the strip 34 is successively engaged by a pair of punch-like members 37 and 38. Each of the punch-like members 37, 38 has a body portion 39 of a size to fit within the pockets 33. The body portion 39 terminates in its free end in a nose 40 which includes an extreme end wall 41. Remote portions of the noses 40 of the two punch-like members 37 and 38 may have sloping side portions 42 to facilitate the entry of the punch-like members into the pockets 33.

The spacing between the body portions 39 of the punch-like members 37, 38 is equal to the width of one of the bars 36 whereby the punch-like members 37, 38 engage the opposite faces of the bars and support the same during the formation of lugs thereon.

The punch-like members 37, 38 are distinguished from normal retainer forming punches in that the opposed sides of the bodies 39 thereof are provided with bar-like projections or punch elements 43 which have their free ends terminating short of the noses 40.

It is also to be noted that each of the punch-like members 37, 38 has formed in the respective nose 40 thereof sockets 46 which are aligned with punch elements 43. It is to be noted that the sockets 46 are of a configuration which correspond to the lugs which are to be formed utilizing the punch-like members 37, 38. It is also to be noted that the sockets 46 are spaced from the free ends of the punch elements 43.

It will be readily apparent from FIGURE 8 that as the punch-like members 37, 38 enter into the pockets 33, the opposed faces of the punch-like elements will engage those faces of the bar 36 which form walls of the pockets receiving the punch-like members and thus these walls of the bar 36 will be supported by the punch-like members 37, 38.

As the punch-like members 37, 38 enter further into the pockets 33, the extreme ends of the punch elements 43 come into engagement with the bars 36 and the metal of the bars along the opposite faces thereof is extruded in the direction of movement of the punch-like elements. The metal displaced by the punch elements 43 is prevented from moving in any direction except in the direction of movement of the punch-like elements 37, 38 by the firm supporting of the bar 36 by the punch-like members. Inasmuch as the strip 34 will be backed up by a suitable anvil or mandrel (not shown), as the punch-like members 37, 38 continue into the pockets 33, the pressure exerted by the metal being displaced under the punch elements 43 will build up along the edge of the respective bar face at its point of contact with the anvil or mandrel, and metal will begin to extrude generally normal to the faces of the bar 36 and into the pockets 33. The outward flow of the metal into the pockets 33 will be controlled by the punch-like members 37, 38 in combination with the anvil or mandrel and the extruded metal will be restricted to extrusion within the sockets 46, which sockets 46 will also serve to shape the metal. As a result, grooves 44 will be formed in the surface portions of the bars 36 and the material of the bars which is dispaced in the forming of the grooves 44 will be extruded into the sockets and shaped thereby to define retaining lugs 45.

At this time it is pointed out that inasmuch as the bar 36 is confined by the punch-like members 37, 38, the punch elements 43 will function as extrusion punches and the sockets 46 will function as extrusion dies. Inasmuch as there is no removal of the metal during the forming of the retaining lugs 45, it may be said that the retaining lugs 45 are formed through a chipless machining operation. Furthermore, inasmuch as the bars 36 are supported by the punch-like members 37, 38 during the formation of the retaining lugs 45, the distortion of the material of the bars 36 will be held to a minimum. In addition, by properly proportioning the punch elements 43 and positioning the sockets 46, the positions of the retaining lugs 45 relative to the boundary faces of the strip 34 may be varied as desired. At the same time, the retaining lugs 45 are formed with a minimum weakening of the bars 36. A further advantage of the method of forming the retaining lugs 45 is that the lugs 45 may be quickly and accurately formed utilizing the same punch press as that utilized in the formation of the pockets 33 by merely adding to the punch assembly (not shown) for forming the strip 34 the required extra punch elements.

After the strip 34 has been formed by the necessary punching or extrusion operation, if it has not been previously severed to length, it is severed to the desired length and then rolled into cylindrical form in accordance with the required diameter of the retainer 31. The ends of the length of the strip 34, if desired, may be secured together by welding as at W in FIGURE 1. It is also pointed out here that under certain conditions, the retainer may be formed of two semi-cylindrical halves which are separate and apart from one another.

Figure 3:
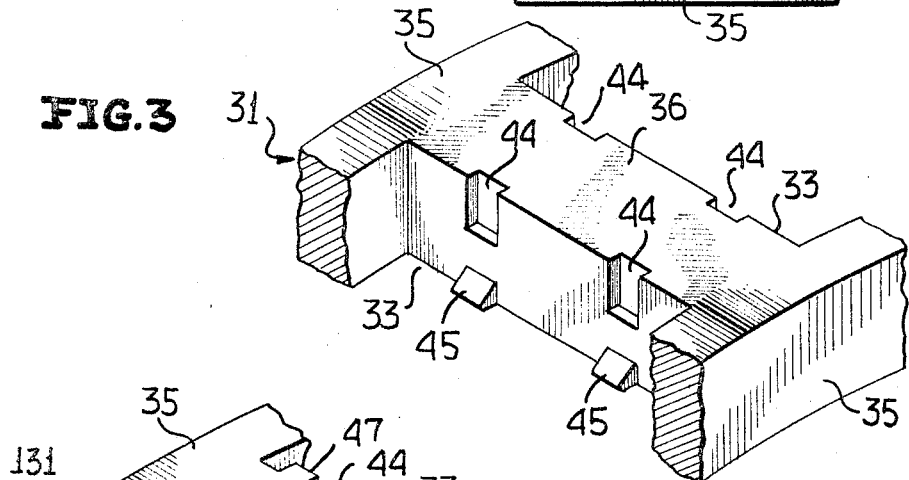
FIGURE 3 is a fragmentary perspective view on a large scale of a retainer formed from the strip of FIGURE 2 and shows the specific construction of the retaining lugs formed along a side of one of the pockets.

Referring now to FIGURE 3, it will be seen that there is illustrated in greater detail the construction of the retainer 31. It is to be understood that the retainer 31 is to be utilized when retaining lugs are required for preventing the movement of rollers out of the pockets 33 in a radially inward direction only.

Figure 4:
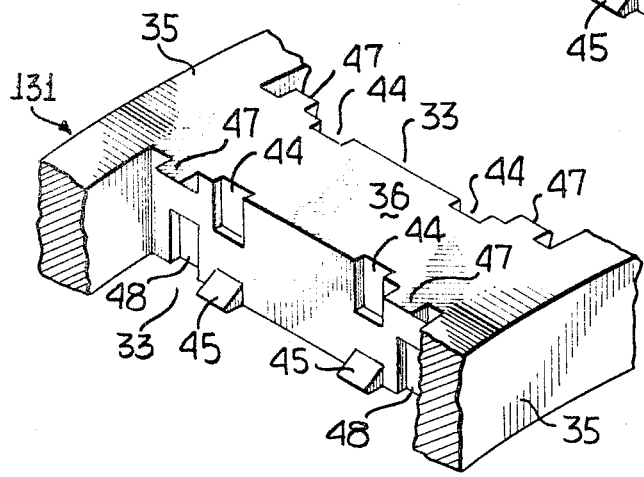
FIGURE 4 is an enlarged fragmentary perspective view similar to FIGURE 3 of a modified form of retaining lug arrangement.

In FIGURE 4 there is illustrated a retainer 131 which is very similar to the retainer 31 and includes the usual rims 35 and the bars 36 defining pockets 33. However, the retainer 131 is specially configurated to have retaining lugs for retaining rollers within the pockets 33 in both directions. In addition to the retaining lugs 45, each bar 36 of the retainer 131 is provided with retaining lugs 47 which face in opposite directions from the retaining lugs 45. When the retaining lugs 47 are formed, additional grooves or recesses 48 are formed in the faces of the bars 36. It will be readily apparent that the retaining lugs 45 and 47 will cooperate to retain rollers within the pockets 33.

In FIGURE 5 there is illustrated a bearing construction which utilizes the retainer 131. The bearing construction includes an inner race member 70 and an outer race member 71, and a roller and retainer assembly is disposed between the race members 70 and 71. The roller and retainer assembly, which is referred to by the numeral 130 includes not only the retainer 131, but also a plurality of conventional rollers 32 which are seated within the pockets 33 thereof. It is to be noted that the retainer 131 is of the roller riding type and is positioned centrally between the race members 70 and 71. The rollers 32 are retained in the pockets 33 against radially outwardly directed movement by means of the lugs 72 while movement of the rollers 32 out of the pockets 33 in a radially inwardly direction is prevented by the lugs 45.

Referring now to FIGURE 6 in particular, it will be seen that there is illustrated a typical bearing installation including a roller and retainer assembly formed in accordance with this invention, the roller and retainer assembly being generally referred to by the numeral 230. The bearing assembly includes an inner race member 60 which may be in the form of a shaft. It also includes an outer race member 61. The roller retainer assembly 230 is positioned between the race members 60 and 61 and rollers 32 thereof are in rolling engagement with each of the race members.

It is to be noted that the retainer 231 of the roller and retainer assembly 230 is of the outer race riding type and has side rims 235 of a greater thickness than the cross bars 236. The rollers 32 are retained within pockets 33 of the retainer 231 against radial outward movement by lugs 62 formed in accordance with this invention. The geometry of the pockets 33 is such that the width of each pocket 33 at the inner boundary thereof is less than the diameter of the rollers 32 whereby the roller 32 is limited in its radial inward movement.

Referring now to FIGURE 7, it will be seen that there is illustrated another typical type of bearing assembly which includes an inner race member 64 which may be a shaft, and an outer race member 65. The outer race member 65 may be in the form of a thin sheet metal type race, as shown. The race members 64 and 65 are retained in spaced relation by a roller and retainer assembly which is generally referred to by the numeral 330.

The roller and retainer assembly 330 includes a retainer 331 formed in accordance with this invention. It is to be noted that the retainer 331 is of the inner race riding type and rides on the race member 64. To this end, the retainer 331 is provided with side rims 335 which are thicker than the cross bars 336 thereof and which project radially inwardly of the cross bars 336.

The retainer 331 is assembled with the outer race member 65 and the outer race member prevents movement of the rollers 32 radially outwardly of the pockets 33. Movement of the rollers 32 out of the pockets 33 in a radially inwardly directed direction is prevented by suitable lugs 66 which are formed in accordance with this invention.

At this time it is pointed out that the retainer 331 is positioned between side flanges 67 of the outer race member 65. As a result, to facilitate the manufacture of the bearing assembly, the retainer 331 is assembled with the outer race member 65 and, while assembled, the two may be hardened by heat treatment. Thereafter, the rollers 32 may be snapped into the pockets 33.

It is also pointed out at this time that while in many instances the retainers of this disclosure will be hardened, this will depend upon the specific use of the retainer. It is also pointed out that in instances where the hardness of the retainer is such that movement of the rollers 32 past the lugs of the retainer would result in the scraping of flats on the rollers, the metal of the retainer in the area of the lugs through which the rollers are snapped may be suitably locally annealed.

Although the specific lug configuration of this disclosure and the method of forming the same has been described as applying to retainers formed from a flat strip, it is to be understood that the same principles may be utilized in retainers which are formed from cylindrical or tubular blanks. In FIGURE 9, there is illustrated a partially formed retainer 431 which has rectangular cross sectional bars 436 with trapezoidal shaped pockets 433. Lugs 80 are simultaneously formed on opposite sides of each bar 436 by means of a punch-like tool, which is generally referred to by the numeral 81. The punch-like tool 81 is constructed similar to the tool of FIGURE 8, and includes two punch-like members 82, 83. The punch-like members 82, 83 includes bodies 84, which correspond to the bodies 39. However, the bodies 84 are narrower than the bodies 39 and freely pass into the pockets 433. On the other hand, the spacing of the bodies 84 is the same as the width of the bars 436 so that the bodies 84 firmly engage the bars 436 and support the same during the formation of the lugs 80. The opposed faces of the bodies 84 are provided with elongated bar like projections which form punch or tool elements 85. It is to be understood that the retainer 431 will be suitably supported on a mandrel, such as the mandrel 78, which will cooperate with the punch-like members 82, 83 in the formation of the lugs 80. It is to be noted that the extreme ends of the punch-like members 82, 83, have sockets 79, formed therein in alignment with the punch elements 85 for the shaping of the retaining lugs 80 in cooperation with the mandrel 78.

Referring now to FIGURE 10 in particular, it will be seen that there is illustrated still another form of retainer, which is generally referred to by the numeral 531. The retainer 531, like the retainer 431, is formed from a cylindrical or tubular blank. However, during the initial punching operation, the retainer 531 is provided with pockets 533 which are rectangular in section and which are separated by bars 536 which are trapezoidal in section. Because of the specific configuration of the pockets 533 and the bars 536, it is not feasible to form lugs, such as the lugs 86, on the opposite sides of a single bar 536 at one time. Instead, the lugs for a single pocket 533 are simultaneously formed by means of a punch 87. The punch 87 has a body 88 of a size to snugly fit within the pockets 533. On opposite sides of the body 88 there are formed elongated bar like projections which function as punch or tool elements 90 to form the lugs 86 on opposite sides of the pocket 533. The body 88 is also provided with a lug shaping socket 91 on each side thereof in alignment with each of the punch or tool elements 90.

It is to be understood that when the lugs 86 are being formed, the retainer 531 will be suitable supported on a mandrel 92. It is feasible that such a mandrel may have spring loaded back-up elements which will project into the pockets 533 on opposite sides of the bar on which lubs 86 are being formed so as to support the bar during the lug forming operation. It is to be understood that the mandrel 92 cooperates with the sockets 91 of the punch 87 to shape the lugs 86.

At this time it is pointed out that while it is preferred that the various punches be provided with sockets for shaping the lugs, it is feasible to form the lower portions of the punch-like members with beveled surfaces, such as the surfaces 42 of the punch-like members 37, 38, which will cooperate with the respective anvils or mandrels to control the extrusion of the material which forms the lugs. However, by providing a beveled surface, as opposed to the sockets, the width of the lugs may not be accurately controlled.

I claim:

1. A retainer for rolling contact bearings, said retainer comprising a pair of side rims and bars extending at spaced intervals between said side rims and combining with said rims to define a plurality of pockets, each of said bars having first face surfaces forming walls of said pockets and second face surfaces extending between said first face surfaces, and each of said first face surfaces having a groove formed therein starting at one of said second face surfaces and extending towards the other of said second face surfaces, and a lug projecting from each of said first face surfaces into a respective one of said pockets, said lug being disposed adjacent said other second face surface in aligned and spaced relation relative to said groove, and each of said lugs being formed solely from material of said first face surfaces displaced in the forming of each of said grooves.

2. The retainer of claim 1 wherein each bar first face surface has a pair of lugs formed thereon, and at least other additional lug formed thereon adjacent said other second face surface intermediate said pair of lugs.

3. The retainer of claim 1 wherein each lug has a sloping roller engageable surface.

4. The retainer of claim 1 wherein each said lug is formed by a chipless machining operation.

References Cited

FOREIGN PATENTS 849,500   9/1952   Germany.

MARTIN P. SCHWADRON, *Primary Examiner.*

FRANK SUSKO, *Assistant Examiner.*